3,008,936
RUBBERY POLYMER CONTAINING A GLYCOLDIURIL AS A SCORCH INHIBITOR AND RETARDER
Jonas Kamlet, New York, N.Y., assignor to The Goodyear Tire & Rubber Company, a corporation of Ohio
No Drawing. Filed Sept. 19, 1958, Ser. No. 761,951
7 Claims. (Cl. 260—83.3)

This invention relates to improved scorch inhibitors and retarders for use in rubber processing. Scorching during the processing of rubber is due to the premature or incipient vulcanization which may occur during any of the steps involved in the processing prior to the final vulcanization step, or during storage between said processing steps. Whereas a properly compounded unscorched rubber formulation can be die-extruded or sheeted from a calender smoothly and without lumping, a scorched material becomes wavy and lumpy after extrusion or sheeting, and must be discarded. The purpose of this invention is therefore to provide an effective, inexpensive and readily preparable group of compounds which are suitable for use as scorch inhibitors and retarders in the processing of rubber, which do not adversely affect the tensile strength, modulus, tear, hardness and elongation values, aging characteristics and other physical properties of the processed rubber, and which do not prolong the time required to attain an equivalent cure. It is the further purpose of this invention to provide a new group of scorch inhibitors and retarders suitable for use in the processing of natural rubber stocks, as well as synthetic rubbers.

The basis of my invention is the finding that compounds of the general formula:

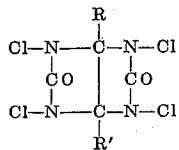

(where R and R' are members of the group consisting of hydrogen and methyl) are highly effective scorch inhibitors and retarders in natural and synthetic rubber processing.

The compounds covered by this invention are therefore three in number:
(1) N,N',N'',N''' - tetrachlorotetrahydroimidaz(d)imidazole-2,5(1,3)-dione (tetrachloroglycoldiuril or tetrachloroacetylenediureine),
(2) N,N',N'',N''' - tetrachlorotetrahydromethylimidaz(d)imidazole - 2,5(1,3) - dione (tetrachloromethylglycoldiuril or tetrachloromethylacetylenediureine), and
(3) N,N',N'',N''' - tetrachlorotetrahydrodimethylimidaz(d)imidazole - 2,5(1,3) - dione (tetrachlorodimethylglycoldiuril or tetrachlorodimethylacetylenediureine). These compounds are suitable for use as scorch inhibitors and retarders at concentrations ranging from 0.05 to 5.0 parts per hundred parts of rubber, and preferably from 0.1 to 2.0 parts per hundred parts of rubber.

When two or more moles of urea are heated in solution with one mole of glyoxal, there is obtained in good yield tetrahydroimidaz(d) - imidazole - 2,5(1,3) dione. Similarly, urea and pyruvic aldehyde (methyl glyoxal) yields tetrahydromethylimidaz(d)imidazole - 2,5(1,3)-dione, and urea and diacetyl (butanedione-2,3) yields tetrahydrodimethylimidaz(d)imidazole - 2,5(1,3) - dione. When these bicyclic compounds are dissolved in aqueous alkali solutions, and are chlorinated, the compounds (1), (2) and (3) described above are obtained in good yields (see Chemical Abstracts, Third Decennial Index, page 5200 for structural identification and nomenclature).

Methods for the preparation of compounds (1), (2) and (3), the scorch inhibitors and retarders of this invention, and the intermediates for the preparation thereof, are further described in PB Report 81830 (FIAT Technical Bulletin T-44), Adkins in U.S. Patent 2,654,763 (1953), Gagarine et al. in U.S. Patent 2,803,564 (1957), Goodman in U.S. Patent 2,697,714 (1954), and Kamlet in U.S. Patent 2,624,686 (1953).

In order to evaluate the scorch inhibitors and retarders of this invention, the following materials were compared in an HAF (high abrasion furnace) black natural rubber tread stock, at the level of 0.50 part by weight per 100 parts by weight of rubber:

(1) Blank, without scorch inhibitor.
(2) N-nitrosodiphenylamine, a commercial scorch inhibitor.
(3) N,N',N'',N''' - tetrachlorotetrahydroimidaz(d)imidazole-2,5(1,3)-dione, referred to as compound A.
(4) N,N',N'',N''' - tetrachlorotetrahydromethylimidaz(d)imidazole-2,5(1,3)-dione, referred to as compound B.
(5) N,N',N'',N''' - tetrachlorotetrahydrodimethylimidaz(d)imidazole-2,5(1,3)-dione, referred to as compound C.
(6) 1,3 - dichloro - 5,5 - dimethylhydantoin, a commercial scorch inhibitor.

The base stock formulation was in parts by weight:

| | |
|---|---:|
| Smoked natural rubber sheets | 100.00 |
| HAF black | 45.00 |
| Stearic acid | 3.00 |
| Zinc oxide | 3.00 |
| Pine tar | 3.00 |
| Sulfur | 2.75 |
| (2)-morpholino-thio-benzothiazole | 0.40 |

The measuring of the scorch inhibition, as evidenced by the delaying action on mixtures containing vulcanization accelerators, is effected by the determination of the viscosity of the mixture in a Mooney plastometer (American Society for Testing Materials, test No. D1077–55T). The results obtined with the scorch inhibitors at 0.50 part per 100 parts of rubber, are:

| | Blank | N-Nitrosodiphenylamine | Compound A | Compound B | Compound C | Dichlordimethyl hydantoin |
|---|---|---|---|---|---|---|
| Mooney scorch, 275° F.—10 point rise above minimum | 9.5 | 13.7 | 12.7 | 12.5 | 12.4 | 9.7 |

Further evaluations on modulus, tensile strengths, and elongation yielded the following results:

| | Blank | N-Nitroso-diphenyl-amine | Compound A | Compound C | Dichlor-dimethyl hydantoin |
|---|---|---|---|---|---|
| 300% Modulus: 275° F.— | | | | | |
| 20' | 900 | 660 | 380 | 540 | 600 |
| 35' | 1,410 | 1,330 | 800 | 1,010 | 1,110 |
| 70' | 1,780 | 1,770 | 1,280 | 1,570 | 1,470 |
| 140' | 1,850 | 1,910 | 1,600 | 1,960 | 1,640 |
| Tensile: 275° F.— | | | | | |
| 20' | 2,690 | 1,390 | 950 | 1,300 | 1,120 |
| 35' | 3,760 | 3,340 | 1,900 | 2,690 | 2,500 |
| 70' | 4,010 | 4,030 | 3,080 | 3,540 | 3,310 |
| 140' | 3,650 | 3,840 | 3,370 | 3,640 | 3,370 |
| Elongation: 275° F.— | | | | | |
| 20' | 560 | 440 | 470 | 480 | 410 |
| 35' | 570 | 540 | 480 | 530 | 500 |
| 70' | 540 | 530 | 520 | 520 | 510 |
| 140' | 490 | 490 | 490 | 470 | 480 |

My evaluations therefore indicate that the compounds of this invention are efficient scorch inhibitors and retarders, that they effectively reduce scorch at processing temperatures but do not inhibit vulcanization at higher temperatures and that they do not cause any deleterious effects on the physical properties and aging characteristics of the treated rubber stocks. In addition, we have found that the scorch inhibitors of this invention do not stain or discolor the treated rubbers at advanced temperatures or under the influence of sunlight, actinic radiation and ultraviolet light.

The compounds of this invention may be used in the curing of any of the known rubbers such as the conjugated diene rubbers which include natural rubber and the various synthetic diene rubbers which are similar to natural rubber, such as polychloroprene; butyl rubber, which is a polymerization product of a major proportion of a mono olefin, such as isobutylene, and a minor proportion of a multi olefin, such as butadiene or isoprene; the rubbery copolymers of butadiene and styrene which may contain from 50 to 75% by weight of butadiene; the rubbery copolymers of butadiene and acrylonitrile and polyisoprene.

While certain representative embodiments and details have been shown for the purpose of illustrating the invention, it will be apparent to those skilled in this art that various changes and modifications may be made therein without departing from the spirit or scope of the invention.

I claim:

1. A rubbery polymer of a conjugated diene which contains as a scorch inhibitor and retarder at least one compound conforming to the following structure

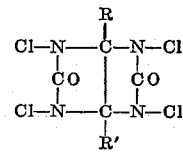

wherein R and R' are members of the group consisting of hydrogen and methyl.

2. A rubbery polymer of a conjugated diene which contains as a scorch inhibitor and retarder N,N',N'',N'''-tetrachlorotetrahydroimidaz(d)imidazole - 2,5(1,3)-dione.

3. A rubbery polymer of a conjugated diene which contains as a scorch inhibitor and retarder N,N',N'',N'''-tetrachlorotetrahydromethylimidaz(d)imidazole - 2,5(1,3)-dione.

4. A rubbery polymer of a conjugated diene which contains as a scorch inhibitor and retarder N,N',N'',N'''-tetrachlorotetrahydrodimethylimidaz(d)imidazole - 2,5-(1,3)-dione.

5. The compositions of claim 1 wherein the scorch inhibitor and retarder is present in concentrations of 0.05 to 5.0 parts per hundred parts by weight of the rubber.

6. A method for retarding the scorching of a rubbery polymer of a conjugated diene during vulcanization comprising adding thereto at least one compound conforming to the following structure

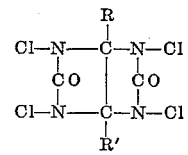

wherein R and R' are members of the group consisting of hydrogen and methyl.

7. A rubber selected from the group consisting of natural rubber, rubbery copolymers of a major proportion of a mono olefin and a minor proportion of a multi olefin, rubbery copolymers of butadiene and styrene, rubbery copolymers of butadiene and acrylonitrile, polychloroprene rubber and polyisoprene rubber, said rubber containing as a scorch inhibitor and retarder at least one compound conforming to the following structure

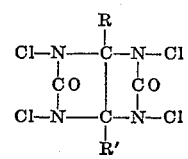

wherein R and R' are members of the group consisting of hydrogen and methyl.

References Cited in the file of this patent

UNITED STATES PATENTS

| 2,171,901 | Wilson et al. | Sept. 5, 1939 |
| 2,638,434 | Adkins | May 12, 1953 |
| 2,649,389 | Williams | Aug. 18, 1953 |